United States Patent [19]
Reynolds

[11] Patent Number: 5,660,591
[45] Date of Patent: Aug. 26, 1997

[54] FLEXIBLE COUPLING DEVICE

[75] Inventor: David F. Reynolds, Greer, S.C.

[73] Assignee: Reliance Electric Industrial Co., Cleveland, Ohio

[21] Appl. No.: 594,999

[22] Filed: Jan. 31, 1996

[51] Int. Cl.$^6$ ............................................. F16D 3/64
[52] U.S. Cl. ............................ 464/88; 277/8; 464/147
[58] Field of Search ............................ 464/88, 87, 89, 464/157, 158, 155, 156, 150; 403/220, 221, 223; 277/8, 235 A

[56] References Cited

U.S. PATENT DOCUMENTS

| | | |
|---|---|---|
| 2,867,102 | 1/1959 | Williams . |
| 2,867,103 | 1/1959 | Williams . |
| 3,747,367 | 7/1973 | Muller ............................ 464/88 |
| 4,473,359 | 9/1984 | Davis ............................ 464/88 |
| 5,564,982 | 10/1996 | Gipson et al. ............................ 464/88 |

*Primary Examiner*—Daniel P. Stodola
*Assistant Examiner*—Eileen A. Dunn
*Attorney, Agent, or Firm*—Timothy A. Cassidy; John M. Miller; John J. Horn

[57] ABSTRACT

The present invention is directed to a flexible coupling device adapted to connect a first rotatable shaft with a second rotatable shaft. The coupling device generally includes a pair of opposing hubs, each of which is adapted to be secured to a respective shaft. A connecting sleeve made from an elastomeric material extends between and engages each of the hubs. According to the present invention, the connecting sleeve also contains a rigid member defining at least one failsafe element or rigid engaging element that prevents the hubs from disengaging the connecting sleeve should the elastomeric material begin to wear and fail.

24 Claims, 2 Drawing Sheets

FLEXIBLE COUPLING DEVICE

BACKGROUND OF THE INVENTION

The present invention generally relates to a flexible coupling device and more particularly to a flexible coupling device having a failsafe mechanism that prevents the device from becoming disengaged during operation.

The present invention is directed to a flexible coupling device of the type that are adapted to connect the end of a first shaft with the end of a second shaft. Such couplings are used, for instance, to transmit rotary or torsional power from a driven rotating shaft to an adjacent nondriven shaft. The couplings also provide flexibility for interconnecting a pair of opposing shafts that are slightly out of alignment.

Examples of flexible couplings for shafts are disclosed in U.S. Pat. Nos. 2,867,102 and 2,867,103, both to Williams, which are incorporated herein in their entireties. In the '102 patent, a flexible coupling is disclosed in which a flexible connecting member is arranged to extend axially between opposed socket members arranged on the shaft ends of two adjacent shafts. Each of the opposing socket members defines an annular recess formed with a plurality of teeth. The flexible connecting member, which is made from an elastic material, is tubular in shape and also includes a plurality of teeth similar in size and shape to the teeth located on the opposing socket members. When assembled, the teeth on the connecting member are in intermeshing engagement with the teeth on the opposing socket members.

The connecting member in the '102 patent can also include a longitudinally extending split that allows the connecting member to be disassembled from the socket members without removing the socket members from the shafts and without disturbing the relative position of the shafts.

In one exemplary application, these types of flexible coupling devices can be used to interconnect a shaft driven by a motor or gear motor with an adjacent shaft that is used to drive a conveyor. The conveyor can be used to transport very heavy materials such as heavy metals, stone, and other mining products. During these types of operations, the flexible connecting member made from an elastic material is placed under a large amount of stress.

Unfortunately, it is inevitable that the elastic connecting member will wear and ultimately fail. When the connecting member fails, the nondriven shaft becomes disengaged with the driven shaft. When this occurs, the conveyor is free to drift in either direction which may cause damage to property or can otherwise present various problems.

The present invention is directed to further improvements in flexible coupling devices. The present invention serves to correct the above-described deficiencies and drawbacks of prior art constructions. In general, the flexible coupling device of the present invention includes a failsafe mechanism that prevents a pair of adjacent shafts from becoming disengaged when the elastomeric element contained within the device wears or deteriorates.

SUMMARY OF THE INVENTION

The present invention recognizes and addresses the foregoing disadvantages, and others of prior art constructions and methods.

Accordingly, it is an object of the present invention to provide a flexible coupling device adapted to connect an end of a first shaft to an end of a second shaft.

Another object of the present invention is to provide a flexible coupling device having a failsafe mechanism that prevents the device from becoming disengaged during operation.

It is another object of the present invention to provide a flexible coupling device having an elastomeric connecting sleeve that includes a rigid member contained therein for preventing the connecting sleeve from disengaging a pair of opposing hubs during use.

Additional objects and advantages of the invention will be set forth in the following description, or may be obvious from the description, or may be learned through practice of the invention.

The objects of the present invention are achieved by providing a flexible coupling device adapted to connect an end of a first shaft to an end of a second shaft. The coupling device includes a pair of opposing hubs that are adapted to be secured to a respective shaft. Each of the hubs includes a sleeve receiving cavity facing toward the opposing hub. Each of the sleeve receiving cavities define at least one sleeve engaging element.

A connecting sleeve, which extends between the opposing hubs, has a first end received in one of the sleeve receiving cavities and a second and opposite end received within the other of the sleeve receiving cavities. The connecting sleeve includes at least one hub engaging element conforming to and mating with the sleeve engaging elements defined by the cavities. The connecting sleeve is made from an elastomeric material.

The flexible coupling device includes a rigid member contained within the connecting sleeve. The rigid member defines at least one rigid engaging element or failsafe element configured to engage the sleeve engaging elements located upon the opposing hubs should the hub engaging elements on the connecting sleeve fail to engage the sleeve engaging elements.

The connecting sleeve can be tubular in shape. The interior surface and the exterior surface of the connecting sleeve can include a plurality of equally spaced hub engaging elements. In this embodiment, the sleeve receiving cavities can be annular in shape and can contain equally spaced sleeve engaging elements located on an inner wall and on an outer wall. The sleeve engaging elements are designed to conform to and mate with the hub engaging elements on the connecting sleeve. The hub engaging elements and the sleeve engaging elements can, for instance, have a wedge-like shape.

The rigid member contained within the connecting sleeve can be made from a metal or plastic material and can have substantially the same conformation as the connecting sleeve. Alternatively, the rigid member can be in the shape of a ring or a plurality of rings. An adhesive can be used to bond the elastomeric material of the connecting sleeve to the rigid member.

These and other objects are also achieved by providing a flexible coupling device including a pair of opposing hubs. Each of the hubs are adapted to be secured to a respective shaft and include an annular sleeve receiving cavity facing toward the opposing hub. Each of the sleeve receiving cavities include an inner wall defining a plurality of teeth and an outer wall also defining a plurality of teeth.

An elastomeric connecting sleeve, extending between the hubs, has a first end received in one of the sleeve receiving cavities and a second end received in the other of the sleeve receiving cavities. The connecting sleeve is tubular in shape and includes an interior surface and an exterior surface. The interior surface and the exterior surface include teeth conforming to and mating with the teeth on the inner walls and the teeth on the outer walls of the sleeve receiving cavities.

The flexible coupling device further includes a rigid member contained within the elastomeric connecting sleeve. The rigid member includes rigid engaging elements conforming to the teeth defined by the sleeve receiving cavities. The rigid engaging elements are configured to prevent the elastomeric connecting sleeve from disengaging from the opposing hubs.

The rigid member can have substantially the same conformation as the elastomeric connecting sleeve and can contain a corresponding rigid engaging element for each of the teeth located on the connecting sleeve. The rigid member can be adhesively bonded to the elastomeric material. The connecting sleeve can be made from any suitable elastomeric material such as a urethane, an EPDM, or a neoprene rubber.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
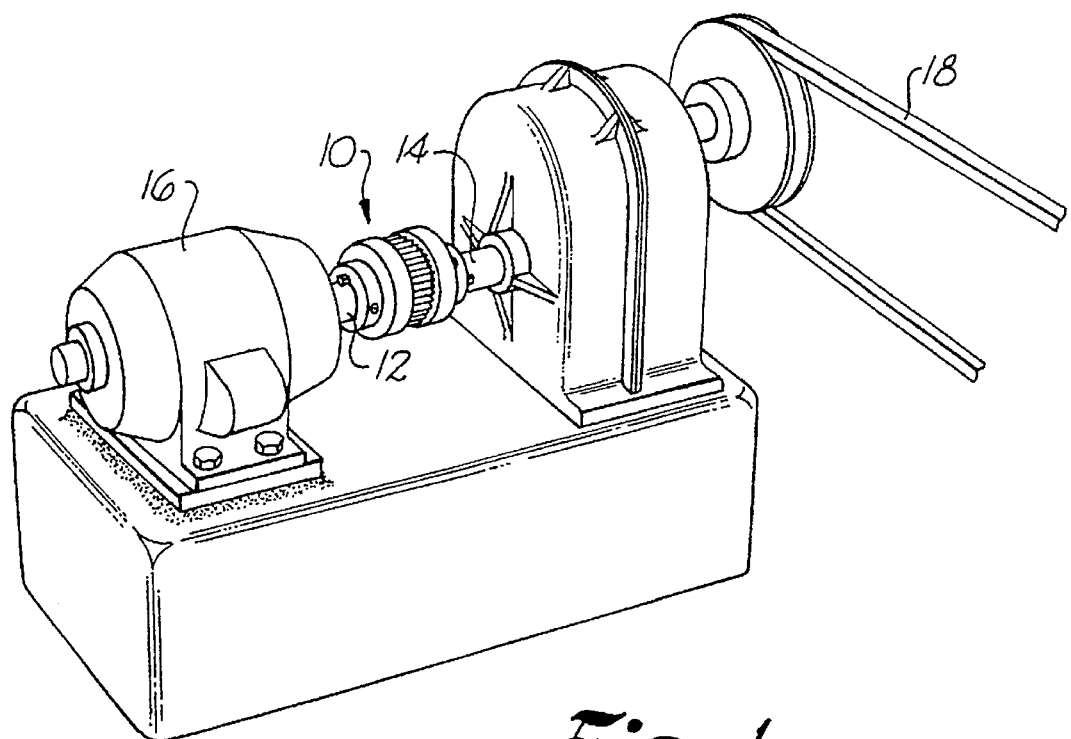
FIG. 1 is a perspective view of one embodiment of a coupling device made according to the present invention shown connecting a first shaft driven by a motor to a second, nondriven shaft.
Figure 2:
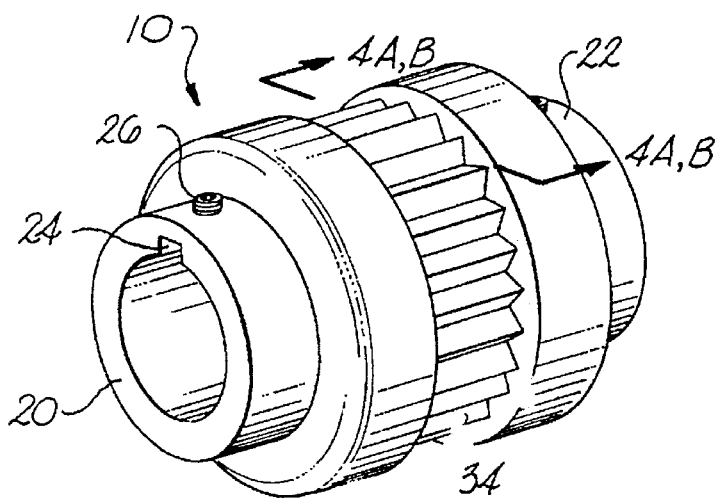
FIG. 2 is a perspective view of one embodiment of a flexible coupling device made according to the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

In general, the present invention is directed to a flexible coupling device of the type that are adapted to connect an end of a first shaft to an end of a second shaft. The coupling device is flexible in that it can accommodate some misalignment between the opposing shafts. Referring to FIG. 1, one embodiment of a flexible coupling device generally 10 made in accordance with the present invention is shown interconnecting a first shaft 12 with a second shaft 14.

As shown, first shaft 12 is rotated or driven by a motor or other similar driving device 16. Through coupling device 10, rotary or torsional power is transmitted from first shaft 12 to second shaft 14. Second shaft 14 is then used, in this embodiment, to drive a belt 18. Belt 18 can be connected to various other equipment to perform a number of different operations. For instance, belt 18 can be used to drive a conveyor for transporting various materials. According to the present invention, flexible coupling device 10 includes a failsafe mechanism that prevents first shaft 12 from becoming disengaged with second shaft 14 should coupling device 10 begin to wear or deteriorate as will be described in more detail hereinafter.

Figure 3:
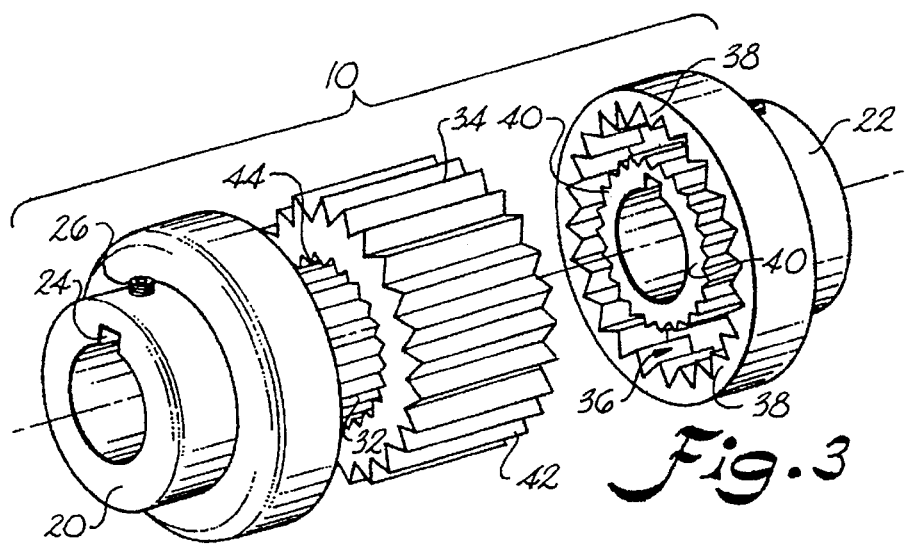
FIG. 3 is a perspective view of a flexible coupling device as shown in FIG. 2 in a disassembled state.
Figure 4A:
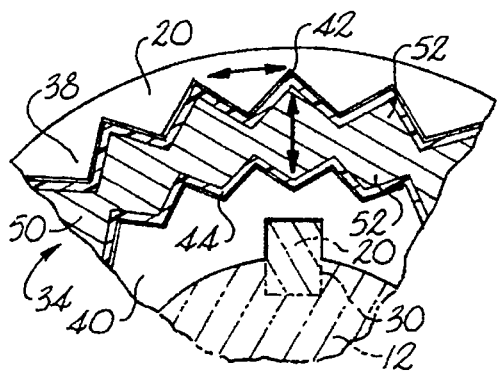
FIG. 4A is a partial cross sectional view taken along line 4A in FIG. 2.
Figure 4B:
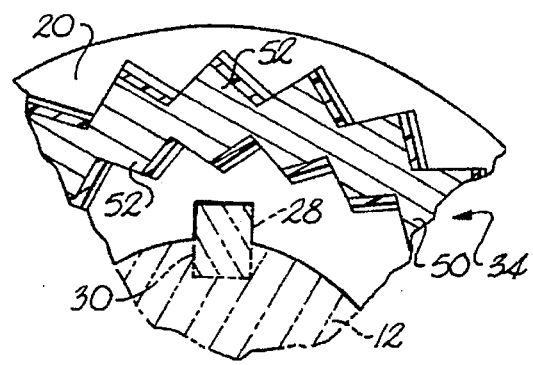
FIG. 4B is a partial cross sectional view taken along line 4B in FIG. 2.

Referring to FIGS. 2, 3, 4A and 4B, flexible coupling device 10 is shown in more detail. As shown particularly in FIGS. 2 and 3, flexible coupling device 10 includes a pair of opposing hubs 20 and 22 coupled together by an elastomeric connecting sleeve 34. Hubs 20 and 22 are each adapted to be placed upon and secured to a respective rotatable shaft. For instance, in the embodiments shown in the figures, hub 20 includes a key receiving notch 24 and a hub securing member 26. As shown in FIGS. 4A and 4B, hub 20 can be placed on a shaft 12 also defining a complementary key receiving notch 30. A locking element 28 is placed in notch 24 on hub 20 and notch 30 on shaft 12 causing hub 20 to be secured to shaft 12 during rotation. Hub securing member or screw 26 can then be used to place a force on locking element 28 against shaft 12 for preventing hub 20 from sliding along shaft 12. Hub 22 can be secured to an opposing shaft using similar means.

As shown in FIG. 3, hub 20 can also optionally include an inner extension member 32. Extension member 32 can be included to extend the width of hub 20 to provide a larger contact area between hub 20 and a shaft when using a locking element. Extension member 32 can alternatively be included for providing a greater contact area between hub 20 and connecting sleeve 34.

The hubs of flexible coupling device 10 each define a sleeve receiving cavity for engaging connecting sleeve 34. For example, referring to FIG. 3, hub 22 defines an annular sleeve receiving cavity 36. Not shown, hub 20 also defines an annular cavity similar in size and shape. Sleeve receiving cavity 36 includes an outer wall having a plurality of sleeve engaging elements or teeth 38. Sleeve receiving cavity 36 also includes an inner wall similarly having a plurality of sleeve engaging elements or teeth 40. When connecting sleeve 34 is inserted into sleeve receiving cavity 36, teeth 38 and teeth 40 engage connecting sleeve 34 when either of the opposing hubs are rotated.

Connecting sleeve 34 in a preferred embodiment is tubular in shape. Connecting sleeve 34 is made from an elastomeric material, such as neoprene rubber, EPDM, a polyurethane, a urethane blend, or any other suitable material. EPDM refers to ethylene and propylene terpolymers with nonconjugated dienes. In one embodiment the elastomer used make connecting sleeve 34 has a Shore A hardness of between about 60 to about 85.

Connecting sleeve 34 has an exterior surface defining a plurality of hub engaging elements, such as teeth 42, and an interior surface also defining a plurality of hub engaging elements, such as teeth 44. Hub engaging elements 42 and 44 are designed to conform and mate with sleeve engaging elements 38 and 40 located on hubs 20 and 22.

Referring to FIG. 4A, a partial cross sectional view of connecting sleeve 34 inserted into hub 20 is illustrated. As shown, preferably when connecting sleeve 34 is inserted into hub 20, a small amount of clearance exists between the hub engaging elements 42 and 44 and the sleeve engaging elements 38 and 40. This slight amount of clearance, which can be for distance between about $20/1000$ of an inch to about $30/1000$ of an inch, permits flexible coupling device 10 to accommodate some misalignment between a pair of opposing shafts which are being connected by the device. Some misalignment is also accommodated by using a connecting sleeve made from an elastomeric material.

In a preferred embodiment as illustrated by the figures, hub engaging elements 42 and 44 and sleeve engaging elements 38 and 40 have a wedge-like shape and are equally spaced over the surfaces of connecting sleeve 34 and the sleeve receiving cavities defined by hubs 20 and 22. Further, inner hub engaging elements 42 can be in radial alignment with outer hub engaging elements 44. This configuration, however, represents only one embodiment by which connecting sleeve 34 can engage hubs 20 and 22. For instance, the number, the spacing and the shape of the hub engaging elements and the sleeve engaging elements may vary. Further, in some applications it may only be necessary to have hub engaging elements on one surface, either the interior surface or the exterior surface of connecting sleeve 34.

According to the present invention and as shown in FIGS. 4A and 4B, flexible coupling device 10 further includes a rigid member 50 which can be contained within connecting sleeve 34. Rigid member 50 is designed to prevent hub 20 from becoming disengaged with hub 22 during operation if the elastomeric material used to make connecting sleeve 34 fails or deteriorates.

In a preferred embodiment, rigid member 50 is tubular in shape and generally has the same conformation as connecting sleeve 34. For instance, connecting sleeve 34 can comprise rigid member 50 coated with an elastomeric material. As shown in FIG. 4A, rigid member 50 includes rigid engaging elements 52 or failsafe elements that can have a wedge-like shape.

In some applications, the elastomeric material used to make connecting sleeve 34 can wear over time, deteriorate, and ultimately fail. As shown in FIG. 4B, according to the present invention, when the elastomeric material used to form hub engaging elements 42 and 44 deteriorates, rigid engaging elements 52 engage with sleeve engaging elements 38 and 40 thus preventing hub 20 from disengaging hub 22. In this manner, a pair of opposing shafts are prevented from disconnecting when using flexible coupling device 10.

Besides being tubular and generally symmetrical with connecting sleeve 34, rigid member 50 may, alternatively, come in a variety of shapes and forms. For instance, rigid member 50 may be in the shape of a ring or a plurality of rings embedded within the elastomeric sleeve. Also, rigid member 50 need only include one rigid engaging element and does not necessarily need to include a rigid engaging element for every hub engaging element included with connecting sleeve 34. Of importance is that rigid member 50 will engage hubs 20 and 22 should the hub engaging elements on connecting sleeve 34 deteriorate and fail.

Rigid member 50 can be made of any suitable rigid material. For instance, rigid member 50 may be made from a metal or a plastic material. Preferably, aluminum or sintered steel is used.

In constructing connecting sleeve 34, rigid member 50 can be dip coated with an elastomeric material or can be placed in a mold and covered with an elastomeric material. In one embodiment, it has been found that the elastomeric material can have a coating thickness of about $60/1000$ of an inch over rigid member 50. Optionally, an adhesive can be used to bond the elastomeric material to rigid member 50. For instance, one adhesive that is suitable for bonding an elastomeric material to metals is CHEM-LOCK marketed by Houston Chemicals. Of course, any suitable adhesive for bonding elastomeric materials to either metals or plastics may be used.

Preferably, connecting sleeve 34 is one unitary piece. However, if flexible coupling device 10 is used to connect together two opposing shafts that cannot easily be moved apart, connecting sleeve 34 can have a two or more piece configuration. For instance, connecting sleeve 34 can be made of two equal halves that can be place over two opposing shafts without having to disturb the position of either of the shafts.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A flexible coupling device to connect an end of a first shaft to an end of a second shaft, said coupling device comprising:

a pair of opposing hubs, each of said hubs being adapted to be secured to a respective shaft, each of said hubs including a sleeve receiving cavity facing toward the opposing hub, each of said sleeve receiving cavities defining at least one sleeve engaging element;

a connecting sleeve extending between said opposing hubs, said connecting sleeve having a first end received in one of said sleeve receiving cavities and a second opposite end received within the other of said sleeve receiving cavities, said connecting sleeve including at least one hub engaging element at each and conforming to and mating with said sleeve engaging elements defined by said cavities, said connecting sleeve being made from an elastomeric material; and a rigid member contained within said connecting sleeve, said rigid member defining at least one rigid engaging element configured to engage at least one of said sleeve engaging elements on each of said opposing hubs should said at least one hub engaging element of said connecting sleeve wear.

2. A flexible coupling device as defined in claim 1, wherein said connecting sleeve is tubular in shape.

3. A flexible coupling device as defined in claim 2, wherein said connecting sleeve has an interior surface and an exterior surface, said at least one hub engaging element comprising a plurality of equally spaced hub engaging elements located on said interior surface and a plurality of equally spaced hub engaging elements located on said exterior surface, and wherein said sleeve receiving cavities are annular in shape having an inner wall and an outer wall containing equally spaced sleeve engaging elements conforming to and mating with said hub engaging elements.

4. A flexible coupling device as defined in claim 1, wherein said at least one hub engaging element on said connecting sleeve and said sleeve engaging elements on said pair of opposing hubs have a wedge-like shape.

5. A flexible coupling device as defined in claim 1, wherein said rigid member is made from a metal or plastic material.

6. A flexible coupling device as defined in claim 1, wherein said rigid member has substantially the same conformation as said connecting sleeve and is embedded within said elastomeric material.

7. A flexible coupling device as defined in claim 1, wherein said rigid member is in the shape of a ring.

8. A flexible coupling device as defined in claim 1, wherein an adhesive is employed to bond said elastomeric material to said rigid member contained in said connecting sleeve.

9. A flexible coupling device to connect an end of a first shaft to an end of a second shaft, said coupling device comprising:

a pair of opposing hubs, each of said hubs being adapted to be secured to a respective shaft, each of said hubs including a sleeve receiving cavity facing toward the opposing hub, each of said sleeve receiving cavities defining at least one sleeve engaging element;

an elastomeric connecting sleeve extending between said pair of opposing hubs, said connecting sleeve having a first end received in one of said sleeve receiving cavities and a second and opposite end received within the other of said sleeve receiving cavities, said connecting sleeve including at least one hub engaging element conforming to and mating with said sleeve engaging elements defined by said cavities; and a rigid member embedded within said elastomeric connecting sleeve, said rigid member having substantially the same conformation as said connecting sleeve, said rigid member defining a rigid engaging element for each of said at least one hub engaging elements located on said connecting sleeve, said rigid elements being configured to engage at least one of said sleeve engaging elements on each of said opposing hubs should said at least one hub engaging element of said connecting sleeve wear.

10. A flexible coupling device as defined in claim 9, wherein said connecting sleeve is made from an elastomeric material, said elastomeric material being a material selected from the group consisting of a urethane, an EPDM, and a neoprene rubber.

11. A flexible coupling device as defined in claim 9, wherein said rigid member is adhesively secured to said elastomeric connecting sleeve.

12. A flexible coupling device as defined in claim 9, wherein said connecting sleeve has an interior surface and an exterior surface, at least one hub engaging element comprising a plurality of equally spaced hub engaging elements located on said interior surface and a plurality of equally spaced hub engaging elements located on said exterior surface, and wherein said sleeve receiving cavities are annular in shape having an inner wall and an outer wall containing equally spaced sleeve engaging elements conforming to and mating with said hub engaging elements.

13. A flexible coupling device as defined in claim 9, wherein said rigid member is made from a material selected from the group consisting of aluminum and sintered steel.

14. A flexible coupling device as defined in claim 9, wherein said connecting sleeve is tubular in shape.

15. A flexible coupling device to connect an end of a first shaft to an end of a second shaft, said coupling device comprising:

a pair of opposing hubs, each of said hubs being adapted to be secured to a respective shaft, each of shaft hubs including an annular sleeve receiving cavity facing toward the opposing hub, each of said sleeve receiving cavities including an inner wall defining a plurality of teeth and an outer wall also defining a plurality of teeth;

and elastomeric connecting sleeve extending between said opposing hubs, said connecting sleeve having a first end received in one of said sleeve receiving cavities and a second end received in the other of said sleeve receiving cavities, said connecting sleeve being tubular in shape and including an interior surface and an exterior surface, said interior surface and said exterior surface including teeth conforming to and mating with said teeth on said inner walls and said teeth on said outer walls of said sleeve receiving cavities; and a rigid member contained within said elastomeric connecting sleeve, said rigid member including rigid engaging elements conforming to said teeth defined by said sleeve receiving cavities, said rigid engaging elements being configured to engage said teeth on each of said opposing hubs should said teeth of said connecting sleeve wear.

16. A flexible coupling device as defined in claim 15, wherein said teeth on said opposing hubs and said teeth on said elastomeric connecting sleeve are wedge-like in shape.

17. A flexible coupling device as defined in claim 15, wherein said teeth on said interior surface of said connecting sleeve and said teeth on said exterior surface of said connecting sleeve are in radial alignment.

18. A flexible coupling device as defined in claim 15, wherein said rigid member has substantially the same conformation as said elastomeric connecting sleeve.

19. A flexible coupling device as defined in claim 15, wherein for each of said teeth on said connecting sleeve said rigid member contains a corresponding rigid engaging element.

20. A flexible coupling device as defined in claim 15, wherein said connecting sleeve and said rigid member are tubular in shape.

21. A connecting sleeve for use in a flexible coupling device to connect an end of a first shaft to an end of a second shaft, said connecting sleeve comprising:

a tubular sleeve made from an elastomeric material, said tubular sleeve having a first end adapted to engage a first hub secured to a shaft, and a second end adapted to engage a second hub secured to an opposing shaft, said tubular sleeve including at least one hub engaging element for engaging said first and second hubs when rotated; and a rigid member contained within said tubular sleeve, said rigid member defining at least one rigid engaging element configured to engage each of said opposing hubs should said at least one hub engaging element of said tubular sleeve wear.

22. A connecting sleeve as defined in claim 21, wherein said rigid member has substantially the same conformation as said elastomeric tubular sleeve.

23. A connecting sleeve as defined in claim 21, wherein said rigid member is embedded within said elastomeric tubular sleeve and is adhesively bonded thereto.

24. A connecting sleeve as defined in claim 21, wherein for each hub engaging element on said tubular sleeve, said rigid member contains a corresponding rigid engaging element.

* * * * *